Feb. 27, 1968     H. C. HUBBARD     3,371,253

CONTROL FOR ELECTRICALLY OPERATED BRAKE

Filed Aug. 30, 1965     4 Sheets-Sheet 1

INVENTOR.
HAROLD C. HUBBARD

BY

*Barnes, Kisselle, Raisch & Choate*

ATTORNEYS

LINEAR

SLOW ATTACK

FAST ATTACK

INVENTOR.
HAROLD C. HUBBARD
BY
ATTORNEYS

Feb. 27, 1968  H. C. HUBBARD  3,371,253
CONTROL FOR ELECTRICALLY OPERATED BRAKE
Filed Aug. 30, 1965  4 Sheets-Sheet 3

INVENTOR.
HAROLD C. HUBBARD
BY
*Barnes, Kisselle, Raisch & Choate*
ATTORNEYS

Feb. 27, 1968   H. C. HUBBARD   3,371,253
CONTROL FOR ELECTRICALLY OPERATED BRAKE
Filed Aug. 30, 1965   4 Sheets-Sheet 4
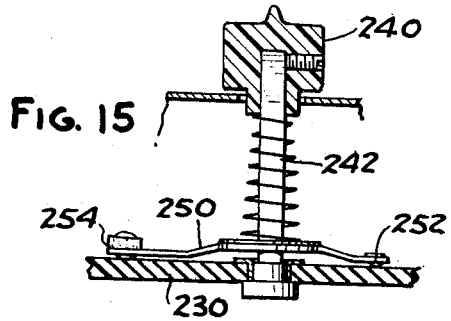
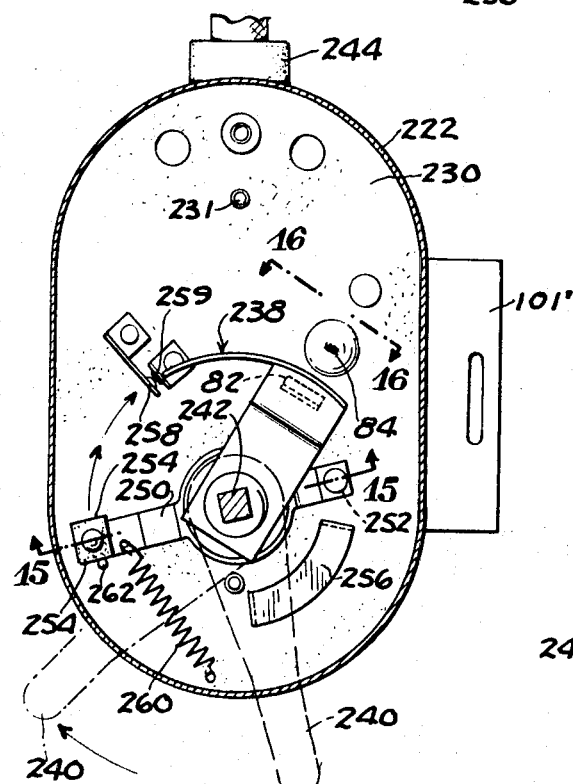
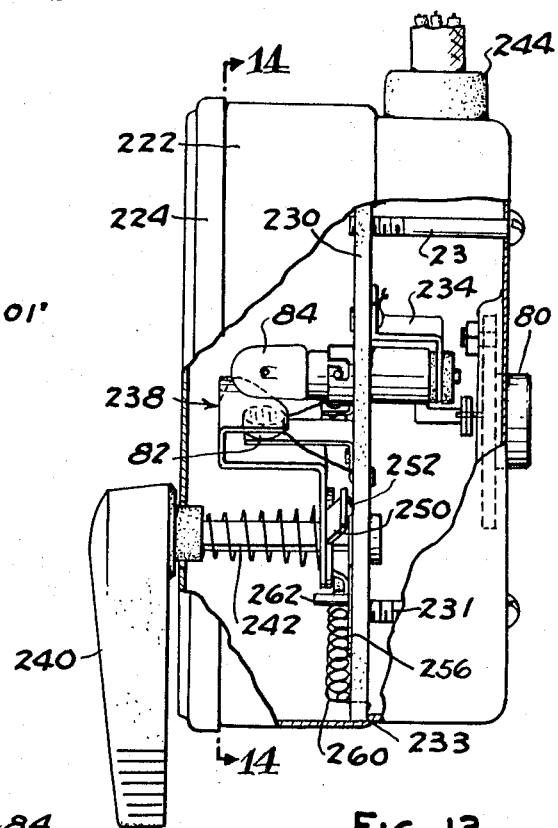
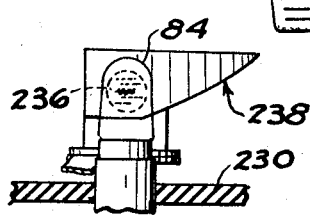
INVENTOR.
HAROLD C. HUBBARD
BY
Barnes, Kisselle, Raisch & Choate
ATTORNEYS

United States Patent Office 3,371,253
Patented Feb. 27, 1968

3,371,253
CONTROL FOR ELECTRICALLY
OPERATED BRAKE
Harold C. Hubbard, Lansing, Mich., assignor to Motor Wheel Corporation, Lansing, Mich., a corporation of Ohio
Filed Aug. 30, 1965, Ser. No. 483,673
21 Claims. (Cl. 317—130)

This invention relates generally to electrically operated brakes and in particular to a remote control circuit for electrically operating brakes from a place remote from the brakes such as the driver's seat of a automotive vehicle.

Although electrically operated brakes have been available for some time and are useful particularly on trailers and other towed vehicles, known remote control circuitry for such brakes has not been entirely satisfactory. Potentiometers and stepped switches have been proposed for use in controlling electrical brakes but they have not provided sufficiently smooth brake operation and are subject to mechanical wear and possible failure.

It is a object of the invention to provide smoother control of electrically operated brakes than has been obtained with known brake control circuits.

Another object of the invention is to provide a control circuit capable of varying the current supplied to electrically operated brakes over a wide current range, say from a few milliamperes to several amperes.

A further object of the invention is to provide a control which is readily adjustable to vary the current supplied to electrically operated brakes so as to provide efficient braking for the particular vehicle on which the brakes are to be used.

A still further object is to provide a control for electric brakes having a control arm which may be manually operated and, in response to linear progression of the arm between end limits of travel, automatically provides an initial surge of current to the electrically energized element of the brake to positively initiate braking and thereafter, a linear or non-linear current build-up as desired for the particular load being braked.

Another object of the invention is to provide a brake control circuit capable of operating one brake of a vehicle harder than another in order to compensate for unequal loads in the vehicle. For example, one side of a trailer may be heavier than the other due to a particular arrangement of appliances or other equipment in the trailer, thus requiring more braking on the heavy side to prevent swaying.

Still another object of the invention is to improve the reliability of brake control circuits by use of components and parts which reduce or eliminate wear problems and are adapted to withstand adverse environmental conditions involved in vehicle brake applications.

In the drawings:

FIG. 13 is a sectional view of one commercial embodiment of a control unit in accordance with the invention.

FIGS. 14, 15 and 16 are sectional views taken respectively on the lines 14—14 of FIG. 13, 15—15 of FIG. 14 and 16—16 of FIG. 14.

Figure 1:
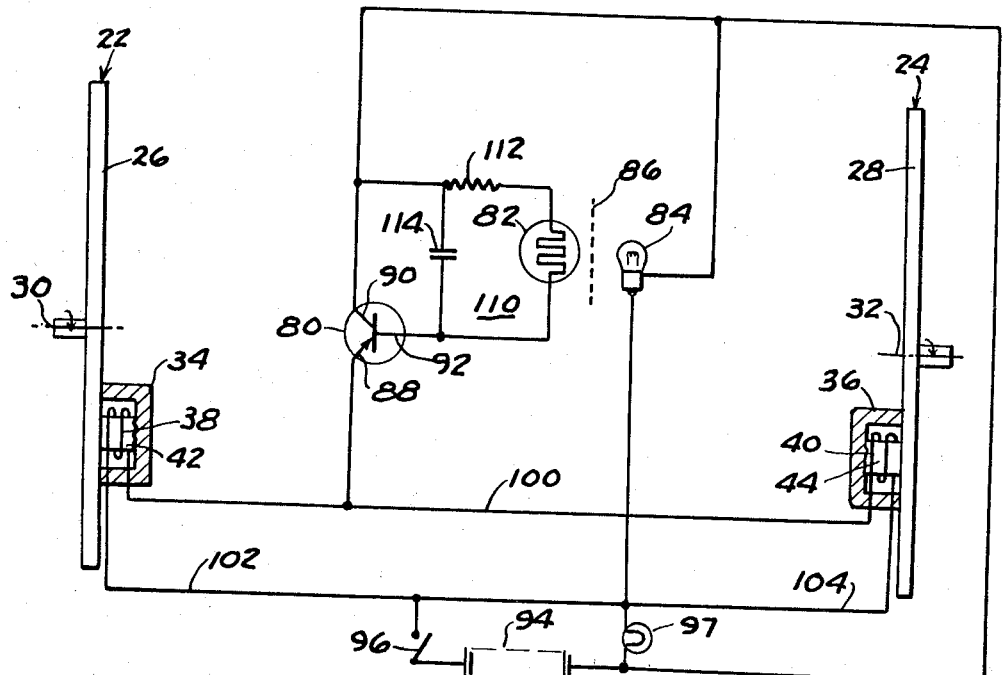
FIG. 1 is a circuit diagram of a brake control circuit in accordance with one embodiment of the invention employing a PNP transistor and a light dependent resistor.

The control circuit 20 of FIG. 1 operates two electric brakes 22 and 24 which are shown schematically in this view. Brakes 22 and 24 have armature discs 26 and 28 respectively which rotate with the wheels of a vehicle about axes 30, 32. Brake pucks 34 and 36 are magnetic cup cores having coils or windings 38 and 40 about the posts 42, 44 of the pucks. When coils 38 and 40 are energized with current, the resulting electromagnetic force generated in the pucks 34 and 36 attracts or draws the same against rotating discs 26 and 28, and the friction drag exerted by the discs on pucks 34, 36 operates the brakes as described hereinafter.

Figure 2:
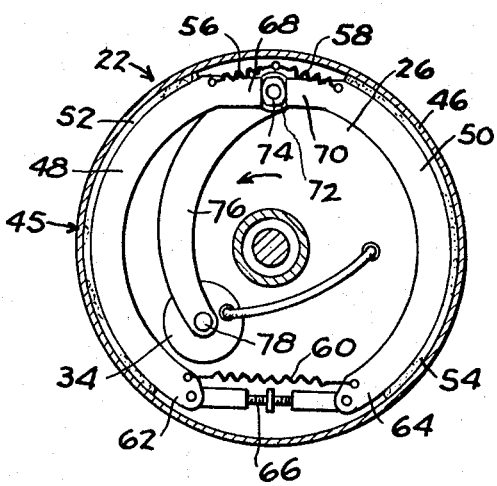
FIG. 2 shows one type of electrically operated brake usable with the brake control of the present invention.

Brake 22 is shown more completely in FIG. 2 to illustrate one known type of brake which may be operated by a brake control circuit in accordance with the invention, but it is to be understood that the control circuit may be used with other types of electric brakes as well. In FIG. 2, disc 26 is located adjacent a brake drum 45 having a rim 46 engagable by linings 52, 54 mounted respectively on conventional brake shoes 48 and 50. Brake shoes 48, 50 are retained by springs 56, 58 and 60, and their lower ends 62, 64 are connected together by the usual adjustable linkage 66. The upper ends 68, 70 of brake shoes 48, 50 abut an operating cam 72 on a pin 74 affixed to a pivotal lever 76 to which puck 34 is attached by means of pin 78. Brake drum 45 and disc 26 rotate with the wheel of the vehicle on which they are installed, whereas pin 74 and the associated support structure for shoes 48 and 50 and lever 76 are mounted stationarily relative to the drum.

When coil 38 within puck 34 is energized, puck 34 is magnetically attracted against the rotating disc 26 as previously mentioned. Assuming disc 26 is rotating clockwise as viewed in FIG. 2, the frictional force exerted by disc 26 on puck 34 swings lever 76 on pivot 74 to the left as viewed in FIG. 2. This pivotal movement of lever 76 rotates operating cam 72 which in turn spreads the upper ends of shoes 48, 50 so that the shoes move outwardly to engage linings 52, 54 with drum 45, thus applying braking force to the wheel. The shoes are shown in an operated position in FIG. 2. An increase of current in puck coil 38 forces puck 34 harder against disc 26, thus increasing the frictionally induced torque in lever 76 and thereby moving puck 34 and lever 76 farther to the left, thus increasing the braking force.

The function of control circuit 20 of FIG. 1 and the modifications thereof to be described herein is to vary current in the puck coils from a minimum "on" value of say a few milliamperes up to a maximum value needed for full braking, and this maximum value may be several amperes. The circuit is such that current in the coils may be controlled accurately and varied gradually if desired, thereby avoiding an undesirable "on-off" type of operating characteristic, i.e., where the brake is either fully operated or released as a result of current in the puck coils (load current) being increased from the minimum "on" value to the maximum value by a very small movement of the operating lever or device, and thus eliminating the need for "fanning" the operating lever (or other operating device) in order to stop the vehicle.

Control circuit 20 achieves smooth and accurate varying of the load current over a wide range by varying the very small base current of a transistor 80 over a corresponding range. Thus, a large current is controlled by a small current by virtue of the gain of the transistor, and very little power is dissipated. Control of the base current is achieved in this embodiment by providing in the base circuit of transistor 80 a light dependent resistor 82, i.e., its resistance value depends on the intensity of the light reaching it. The resistance value of resistor 82 is varied by varying the intensity of light illuminating the same and emanating from a lamp 84. Preferably, this is accomplished conveniently by positioning between lamp 84 and resistor 82 a movable gate or shutter, shown schematically in FIG. 1 as dashed line 86, which is operated manually by a lever 106 (FIGS. 6 and 12) or other suitable device to control the amount of light reaching resistor 82. Alternatively, the illumination of resistor 82 may be varied by moving lamp 84 or resistor 82 or both components relative to each other, or by varying the energizing current of lamp 84. However, a movable gate 86 is considered to be more practical in this circuit since it eliminates the problems associated with supplying current to movable circuit components.

The emitter 88 of transistor 80 is connected to one end of each puck coil 42 and 44, and their other ends are connected to a battery 94 through a normally open switch 96 which is closed by the initial movement of lever 106 in moving gate 86. Closing switch 96 energizes a stop light 97 and control lamp 84, these lamps being connected across the series combination of switch 96 and battery 94. Since transistor 80 is a PNP type, its emitter is connected to the positive side of battery 94 and its collector 90 is connected to the negative side thereof.

Figure 12:
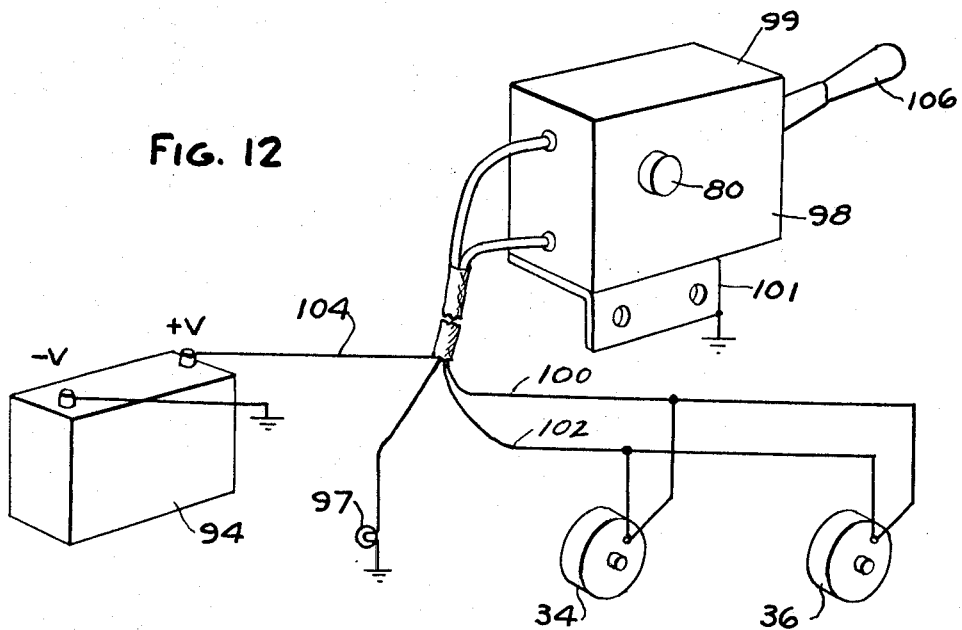
FIG. 12 shows packaging and external wiring for a brake controller.

The negative terminal of most automotive batteries is grounded (chassis ground) and hence collector 90 may likewise be grounded. Since the case of many PNP power transistors is the collector terminal, collector 90 may be grounded by simply mounting the case of transistor 80 on a grounded base which may be part of the housing for the control unit. This is illustrated in FIG. 12 wherein transistor 80 is mounted on the side of a metal housing 98 for the control unit 99 whose metal mounting bracket 101 is adapted for connection to a suitable mount in the vehicle which is at chassis ground potential, as is the negative terminal of battery 94, and where lever 106 is within easy reach of the driver. Emitter 88 is connected to coils 38 and 40 via lead 100, and the coils are connected to the positive terminal of battery 94 via leads 102 and 104 respectively. Lever 106 which operates light gate 86 (FIG. 1) is shown in FIG. 12 as stop light 97.

Although a hand operated lever has been provided for this unit, the usual foot operated brake lever of a vehicle may be substituted for the hand lever by providing a gate on it and positioning the control lamp and the light dependent resistor on opposite sides of that gate, thereby obtaining conjoint, correlated operation of the vehicle and trailer brakes.

Referring again to FIG. 1, light dependent resistor 82 is in a network 110 which is connected between base 92 and collector 90. Network 110 includes, in addition to light dependent resistor 82, a fixed resistor 112 in series with resistor 82 and a capacitor 114 connected to the base 92 and collector 90. When switch 96 is open, capacitor 114 is uncharged. Therefore, when switch 96 is closed by the initial movement of lever 106 (FIG. 12), capacitor 114 causes a small surge of current through transistor 80 and coils 42 and 44 which charges capacitor 114. Thereafter, capacitor 114 has no effect on circuit 20. Capacitor 114 discharges to ground (negative side of battery) through resistors 82 and 112 when switch 96 is opened again. The surge current is large enough to insure pucks 34 and 36 are forced into firm contact with discs 26 and 28 regardless of how far they may be intially separated from the discs. The surge current, then, compensates for some variation in the rest position of pucks 34 and 36.

After capacitor 114 is fully charged, the base current of transistor 80 is controlled by light dependent resistor 82, and this in turn controls the load current through coils 42 and 44. In the minimum "on" position of lever 106 and gate 86, very little light from lamp 84 reaches resistor 82, and hence the resistance value of resistor 82 is at its maximum and consequently the base current and load current are at their minimum value. As lever 106 is moved further in the "on" direction, more light reaches the resistor 82 and its resistance value decreases, thereby increasing both the base current and the load current to apply greater breaking force.

Figure 7:
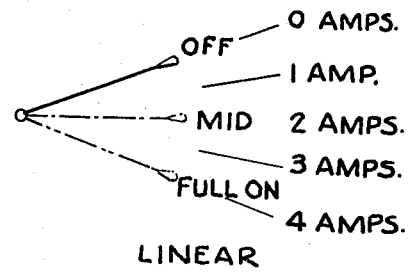
FIG. 7 shows control lever positions for a linear type of control.
Figure 8:
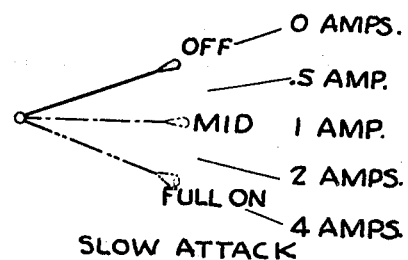
FIG. 8 shows control lever positions for a non-linear control wherein load current builds up at an increasing rate.
Figure 9:
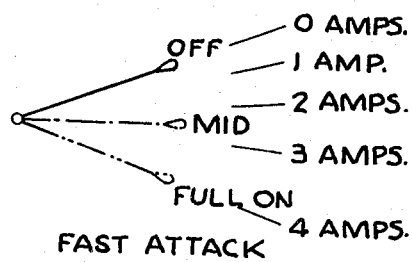
FIG. 9 shows control lever positions for a non-linear control wherein load current builds up at a decreasing rate.

Three different types of control action are illustrated schematically by FIGS. 7, 8 and 9. FIG. 7 shows three lever positions ("off," "mid" and "full on") and corresponding load current values for a linear type of control action wherein equal increments of lever movement anywhere between its end limits of travel cause equal increments of current change. FIG. 8, on the other hand, illustrates a non-linear type of control action identified as "slow attack." In this case, current increases slowly during initial lever movement from "off" to "mid" position and increases at an accelerating rate as lever movement continues from "mid" to "full on." FIG. 9 illustrates a non-linear control action labelled "fast attack" where load current increases at a decelerating rate as the lever moves from "off" to "full on." These various modes of operation are readily obtained by suitably shaping light gate 86 so as to pass light in a linear, accelerating non-linear or decelerating non-linear manner corresponding to the three types of control action illustrated in FIGS. 7–9.

Figure 3:
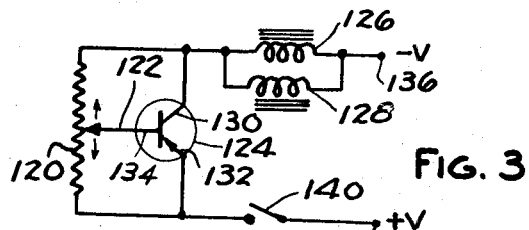
FIG. 3 is a circuit diagram illustrating a modification wherein the puck coils are connected to the collector of the transistor rather than to the emitter as in FIG. 1.
Figure 4:
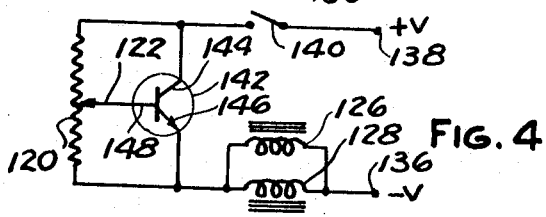
FIG. 4 is a circuit diagram for a modification wherein the puck coils are connected to the emitter of the transistor, but an NPN transistor is used rather than a PNP type as in FIG. 1.
Figure 5:
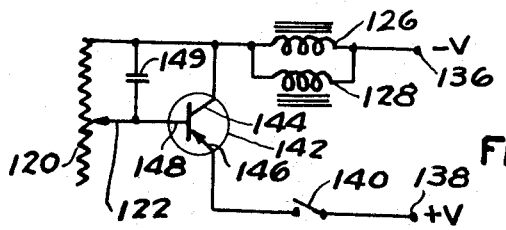
FIG. 5 is a circuit diagram for a modification wherein the puck coils are connected to the collector of the transistor (unlike FIG. 1), but a self-bias network is used similar to that of FIG. 1.

FIGS. 3, 4 and 5 illustrate modifications of the control circuit 20 within the scope of the invention. In each of these modified circuits, a potentiometer 120 is connected by its slider 122 to the base of the associated transistor to provide a variable resistance in lieu of light dependent resistor 82 for controlling the base current of the transistor of the control circuit. However, a light dependent resistor is preferred since it has no parts subject to wear and, being fully encased, is protected from dust and dirt.

In FIG. 3, a PNP transistor 124 and two puck coils 126 and 128 are connected in parallel between collector 130 of transistor 124 and the negative battery terminal 136. Thus, the puck coils may be connected to the collector rather than the emitter of the transistor as in FIG. 1, but in either case, the puck coils are in series with the emitter-collector current path of the transistor. Emitter 132 is connected to positive battery terminal 138 through a switch 140, and base 134 is connected to slider 122 of potentiometer 120.

When switch 140 is closed, the emitter to collector current of transistor 124 divides and flows through parallel puck coils 126 and 128 to simultaneously operate the associated brake pucks in the manner described previously. If slider 122 is moved downwardly from its illustrated mid-position, the resistance in series with the base increases to decrease base current and therefore decrease load current through coils 126 and 128, thus producing less braking force. Conversely, if the slider is moved upwardly, base current and load current increase.

FIG. 4 is similar to FIG. 3, and like reference numerals are used for like components. Coils 126 and 128 are connected in parallel between the emitter 146 of an NPN type transistor 142 and the negative battery terminal 136. A switch 140 is connected between collector 144 of transistor 142 and the positive battery terminal 138. Base 148 of transistor 142 is connected to slider 122 of potentiometer 120 which is shown in its mid-position. Movement of slider 122 has the same effect as in FIG. 3; i.e., downward movement decreases load current and upward movement increases load current.

The circuit of FIG. 5 is also similar to FIG. 3, the connections and components being identical except that in FIG. 5 there is no external connection between potentiometer 120 and emitter 146 of transistor 142, and a capacitor 149 is connected from base to collector as in FIG. 1 to provide an initial surge current. The transistor is self-biased with these connections, but the control action is the same as described in connection with FIG. 3.

Figure 6:
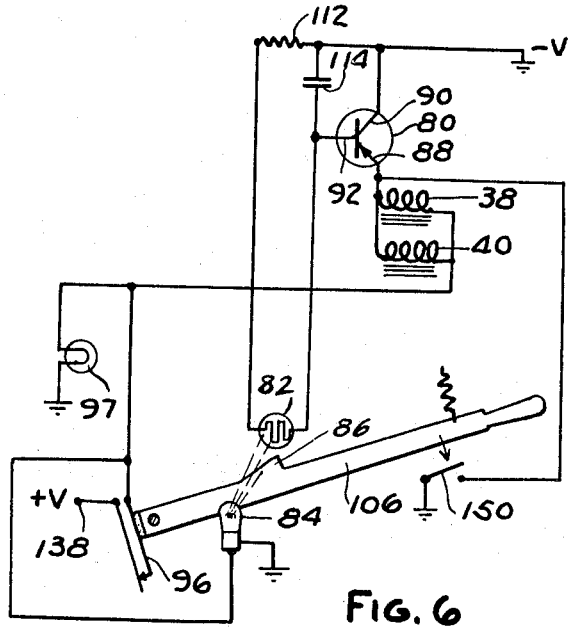
FIG. 6 is a circuit diagram for an embodiment in which switches are employed in conjunction with a control lever to bypass the transistor after it reaches maximum conduction and transfer full load current directly to the puck coils.

FIG. 6 is a circuit diagram for an embodiment similar to FIG. 1, the only difference being that an additional switch 150 is connected from the emitter 88 of transistor 80 to ground (the negative battery potential). The remainder of the circuit is electrically the same as circuit 20 of FIG. 1 and hence the same reference numerals are used in both figures. Light gate 86 comprises a vane on operating lever 106 which is pivotally mounted to swing the vane across the light beam cast between control lamp 84 and light dependent resistor 82.

Switches 96 and 150 are both open when lever 106 is in its "off" position, but switch 96 is shown closed in FIG. 6 corresponding to an initial "on" position of lever 106 and a corresponding "on" condition of the control circuit. When lever 106 is moved further in the "on" direction (downwardly in FIG. 6), it reaches a position wherein gate 86 does not block any part of the light beam between lamp 84 and light dependent resistor 82. At this point, the current flowing through transistor 80 is at its maximum value. However, a still further increase in current through coils 38 and 40 may be obtained by simply bypassing the transistor, thus eliminating its dissipation. This is accomplished by moving lever 106 to its "full on" position to thereby close switch 150. With switch 150 closed, a circuit is completed from the positive battery terminal 138 through switch 96, coils 38, 40 and switch 150 to ground, thus bypassing transistor 80 to provide maximum current in the coils. Switch 150 also serves as a safety device in the event some other part of the control circuit should fail.

Figure 10:
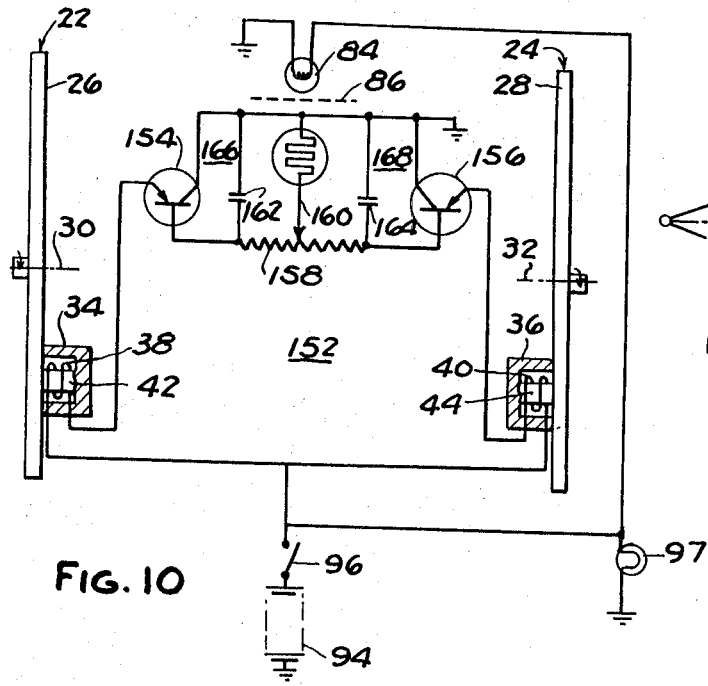
FIG. 10 is a control diagram for an embodiment which is adjustable so as to operate one brake harder than another.

FIG. 10 shows a control circuit 152 which has two transistors 154 and 156 and a potentiometer 158 with a slider 160 which together allow circuit 152 to be preset or adjusted so as to produce different amounts of current in the two puck coils 38 and 40. Two capacitors 162 and 164 are connected from base-to-collector across the two transistors 154 and 156 respectively. Capacitors 162 and 164 charge up when switch 96 is closed to provide surge currents in coils 38 and 40 in the same manner as has been described in connection with capacitor 114 of FIG. 1. Much of circuit 152 is like circuit 20 of FIG. 1 and the same reference numerals have been used for like components.

The bases of transistors 154 and 156 are connected respectively to opposite ends of potentiometer 158, and slider 160 of potentiometer 158 is connected to one terminal of light dependent resistor 82, the other terminal of which is grounded, as are the collectors of transistors 154, 156 and one plate of the capacitors 162, 164. The emitter of transistor 154 is connected to puck coil 38 and the emitter of transistor 156 is connected to puck coil 40. The other ends of coils 38 and 40 are connected to the positive side of battery 94 via switch 96.

Slider 160 is shown (FIG. 10) in a mid-position wherein the resistance of potentiometer 158 is divided equally between the base circuits 166 and 168 for transistors 154 and 156 respectively. In this condition, the current supplied from battery 94 will divide equally between coils 38 and 40 and equal currents will flow in transistors 154 and 156 for any "on" position of gate 86. If slider 160 is moved to the left as viewed in FIG. 10, the resistance in base circuit 168 increases and the resistance in base circuit 166 decreases. Consequently, more current will flow through coil 38 and transistor 154 than through coil 40 and transistor 156 for any given "on" position of light gate 86. Consequently, the brake associated with disc 22 will be applied harder than the brake associated with disc 24. On the other hand, if slider 160 is moved to the right of its mid-position, the brake associated with disc 24 will be applied harder than the other brake for any position of gate 86. Therefore, by adjusting slider 160, it is possible to compensate for unequal loading of the brakes. When the brakes are used on a trailer, the control of FIG. 10 permits adjustment from within the towing vehicle to compensate for unequal loading caused by uneven distribution of the trailer's weight and that of the equipment in it.

Figure 11:
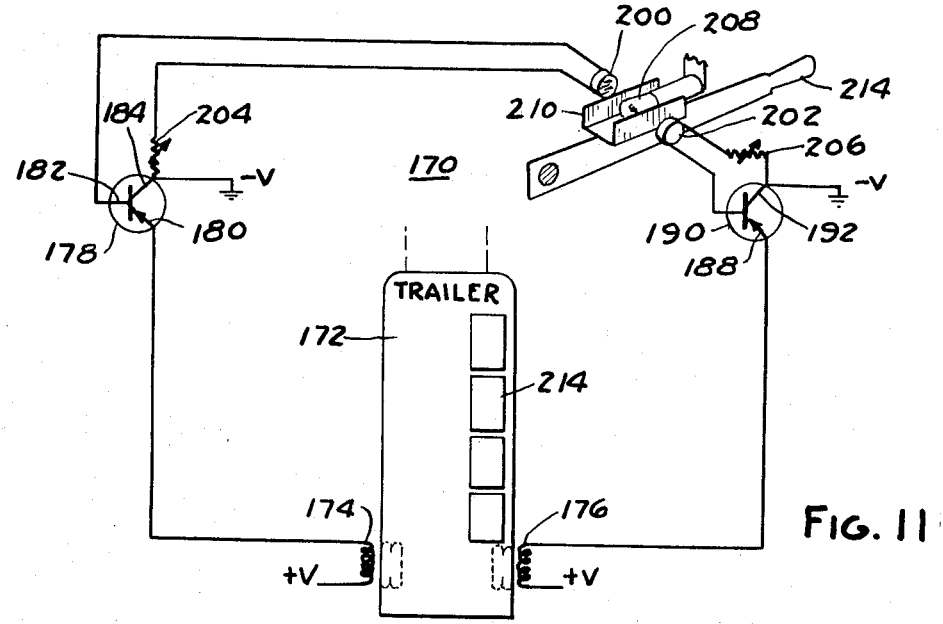
FIG. 11 is a circuit diagram for another embodiment capable of operating one brake harder than the other.

FIG. 11 shows a circuit 170 which illustrates another way of compensating for unequal brake loads using two light dependent resistors 200, 202. A trailer 172 is shown schematically in FIG. 11, and puck coils 174 and 176 are associated respectively with wheels and brakes on the left and right sides respectively of the trailer. The emitter 180 of transistor 178 is connected to puck coil 174 and the emitter 188 of transistor 186 is connected to puck coil 176, both coils being connected to positive supply potential (+V.) The collectors 184 and 192 of the transistor are grounded, and the bases 182 and 190 are respectively connected to one terminal of the light dependent resistors 200 and 202. The other terminals of light dependent resistors 200 and 202 are respectively connected to one end of the variable resistors 204 and 206 which in turn are grounded at the other end.

A control lamp 208 is positioned between the light dependent resistors 200 and 202, and there are two light gates 210 and 212 mounted on lever 214 and located on opposite sides of lamp 208. By making either or both of the resistors 204 and 206 variable, the amount of resistance in the base circuits of the two transistors may be adjusted to compensate for unequal brake loads; that is, to apply one brake harder than the other. In FIG. 11, the right side of trailer 172 is heavier than the left side because there are several units of equipment 214 on the right side. To compensate for this unbalanced load, resistor 206 is set at a smaller value than resistor 204 so that more current will flow through coil 176 and transistor 186 than through coil 174 and transistor 178 for any position of lever 214. Alternatively, either or both of gates 210 and 212 may be adjustable relative to one another to accomplish the same result as is achieved with variable resistors in FIG. 11.

FIGS. 13–16 illustrate one commercial form of the brake control unit 220 of the invention in which the previously described circuit components of FIG. 6 of the invention, except for the puck coils, are contained in a metal housing body 222 and cover 224 which form a protective enclosure for the circuit components. The PNP power transistor 80 in a TO-3 package is bolted to the bottom side of a housing body 222, and the mounting base 228, which is the collector terminal of transistor 80, is in physical and electrical contact with the housing. The housing, therefore, is a ground connection and also acts as a heat sink for dissipating heat produced in the transistor while it is operating. There is a terminal board assembly 230 secured by machine screws 231 against a peripheral shoulder 233 of housing 222 to which a lamp 84 is secured by means of a bracket 234. Light dependent resistor 82 is located behind a linearly contoured (FIG. 16) light gate 238 which is mounted to rotate with a square post 242 operated by a handle 240. A connector harness 244 is provided in the side of the housing for interconnecting internal and external wiring. A cross-arm 250 is also secured to post 242 for rotation therewith and carries contact button 252 and insulation bumper 254 at opposite ends thereof adapted respectively to make contact with a contact strip 256 and to close a pair of contacts 258, 259 mounted on board 230. Contacts 252 and 256 function as switch 96, and bumper 254 and associated contacts 258 and 259 function as switch 150, both described previously. A tension coil spring 260 biases arm 250 against the "off" limit stop 262, and the fixed contact 259 serves as the limit stop determining the "full on" position of arm 250 and associated handle 240.

It is evident from the foregoing description that the brake control circuit of the invention has several advantageous characteristics. It achieves smooth, accurate control over a wide range of load current. Solid state components are used to minimize wear and thus increase reliability. The control action may be linear or non-linear as required, and surge current and maximum load switching features are readily incorporated in the circuit. The complete control unit is rugged enough to withstand the severe stresses to which it may be subjected when installed and used in an automotive vehicle.

I claim:

1. A circuit for controlling electrically operated brakes adapted for use in connection with an automtoive vehicle having a source of elecrical energy, said circuit comprising at least one amplifying electron device having a charge-emitting electrode, a charge-collecting electrode and a control electrode, coil means for actuating the brakes, means connecting said coil means in series with the charge-emitting and charge-collecting electrodes of said electron device, means for connecting the series combination of said coil means and said electron device to said source of electrical energy, variable impedance means connected to said control electrode of said electron device for varying current therein to thereby vary current through said coil means and means operable by a driver of the vehicle to vary said impedance means.

2. The circuit of claim 1 in which said electron device is a transistor.

3. The circuit of claim 1 in which said variable impedance means comprises a variable resistance device.

4. The circuit of claim 3 in which said variable resistance device comprises a light dependent resistor and a light source for illuminating said light dependent resistor.

5. The circuit of claim 4 in which said driver operated means includes a gate between said light dependent resistor and said light source for controlling the amount of light reaching said light dependent resistor from said light source.

6. A circuit for controlling electrically operated brakes adapted for use in connection with an automotive vehicle having a voltage source, said circuit comprising at least one transistor having an emitter, a collector and a base, coil means for actuating the electrically operated brakes connected in series with the emitter-collector path of said transistor, means for connecting the series combination of said coil means and said transistor to the voltage source of the vehicle, variable impedance means connected between the base of said transistor and the emitter-collector path thereof for varying emitter-base current and emitter-collector current through said transistor to thereby vary current flow through said coil means, and means operable by a driver of the vehicle to vary said impedance means.

7. The circuit of claim 6 in which said variable impedance means comprises a variable resistance device.

8. The circuit of claim 7 in which said variable resistance device comprises a light dependent resistor and a lamp for illuminating said resistor.

9. The circuit of claim 8 in which said driver operated means includes a gate located between said light dependent resistor and said lamp for controlling the amount of light reaching said light dependent resistor from said lamp.

10. A circuit for controlling electrically operated brakes adapted for use in connection with an automotive vehicle having a source of electrical energy, said circuit comprising at least one transistor having an emitter, a collector and a base, coil means for actuating the electrically operated brakes, means connecting said coil means in series with the emitter-collector current path of said transistor, means for connecting said coil means and said transistor to said source of electrical energy, circuit means connected between the base of said transistor and the emitter-collector path thereof, said circuit means including variable impedance means for varying emitter-base current and emitter-collector current through said transistor to thereby vary current flow through said coil means, and said circuit means further including a capacitor for producing a surge current through said transistor when said transistor is initially rendered conductive, and means operable by a driver of the vehicle to render said transistor conductive and to vary said variable impedance means.

11. The circuit of claim 10 further including switching means actuated by said driver operated means for connecting said coil means in circuit with said source of electrical energy and bypassing said transistor means for supplying a maximum current through said coil means.

12. A circuit for controlling electrically operated brakes adapted for use in connection with an automotive vehicle having a source of electrical energy, said circuit comprising at least one transistor having an emitter, a collector and a base, coil means for actuating the electrically operated brakes, means connecting said coil means in series with the emitter-collector current path of said transistor, means for connecting said coil means and said transistor to said source of electrical energy, a capacitor connected between the base of said transistor and the emitter-collector current path thereof for producing a surge current through said transistor and said coil means when said transistor is rendered conductive, a light dependent resistor connected between the base of said transistor and the emitter-collector current path thereof, a lamp for illuminating said light dependent resistor, means for supplying current from said source to said lamp, a gate located between said lamp and said light dependent resistor for controlling the amount of light from said lamp reaching said resistor, and means operable by a driver of the vehicle to render said transistor conductive and to move said gate to vary the illumination of said resistor and thereby vary current through said coil means.

13. The circuit of claim 12 in which said driver operated means includes a control member movable from an off position to a maximum on position, a first switch connected in series with said coil means and said transistor and operable by said control member by initial movement thereof in the on direction to render said transistor conductive, and a second switch operated by said control member in the maximum on position thereof to connect said coil means in circuit with the source of electrical energy and bypassing said transistor.

14. A circuit for controlling electrically operated brakes adapted for use in connection with an automotive vehicle having a source of electrical energy, said circuit comprising first and second transistors each having an emitter, a collector and a base, first and second coil means for actuating the electrically operated brakes, means connecting said first coil means in series with the emitter-collector current path of said first transistor, means connecting said second coil means in series with the emitter-collector path of said second transistor, means for connecting the series combination of said first transistor and first coil means in parallel with the series combination of said second transistor and second coil means, means for connecting the series-parallel combination of said transistors and coil means to the source of electrical energy, light dependent resistor means connected between the bases and the emitter-collector paths of said transistors, a lamp for illuminating said light dependent resistor means, means for supplying current from said source to said lamp, and means operable by a driver of the vehicle to vary the illumination of said light dependent resistor means by said lamp.

15. The circuit of claim 14 in which said driver operated means includes gate means located between said lamp and said light dependent resistor means and movable to vary the illumination of said light dependent resistor means by light from said lamp.

16. The circuit of claim 14 further including variable resistance means in circuit with said light dependent resistor means and the base of at least one of said transistors for making one of said transistors more conductive than the other over the range of control of said driver operated means to thereby operate one brake harder than another.

17. The circuit of claim 16 in which said light dependent resistor means is a single component and said variable resistance means is in circuit with the bases of both of said transistors.

18. The circuit of claim 16 in which said light dependent resistor means comprises a first light dependent resistor connected to said first transistor and a second light dependent resistor connected to said second transistor, and in which a said variable resistance means is in circuit with at least one of said light dependent resistors and the associated transistor.

19. A device for controlling electrically operated brakes comprising an opaque housing, a post rotatably mounted in said housing, a light gate fixed to said post and adapted to swing in an arc in said housing in response to rotation of said post, a lamp mounted in said housing on one side of the arc of travel of said light gate, means for energizing said lamp, a light dependent resistor mounted on the other side of said arc of travel of said light gate, said light gate being contoured to vary the amount of light cast by said lamp on said resistor as said light gate moves through said arc of travel thereof, amplifying electron means supported by said housing including input terminals and output terminals, means connecting said light dependent resistor in circuit with said input terminals for varying the gain of said amplifying electron means and means for connecting across said output terminals a source of electrical energy and coil means for actuating the brakes.

20. The combination set forth in claim 19 wherein said last mentioned means comprises a crossarm mounted on said post for rotation therewith, a contact on one end of said crossarm, a bumper made of insulating material on the other end of said crossarm, a contact strip mounted in said housing and adapted to be contacted by said contact during the major portion of travel of said crossarm when said post is rotated to thereby provide an on-off switch in the load circuit, and a pair of contacts mounted in said housing and adapted to be actuated by engagement with said bumper at a full on position of said crossarm, and means connected to said pair of contacts for shunting the load circuit across said output terminals.

21. The combination set forth in claim 19 wherein said amplifying electron means comprises a PNP power transistor having a mounting base functioning as a collector terminal of said transistor, said mounting base being attached in physical and electrical contact with one wall of said housing, said wall being made of electrical and heat conducting material and being in circuit with said last-mentioned means.

References Cited
UNITED STATES PATENTS 3,324,372   6/1967   Myers _____ 318—345

LEE T. HIX, *Primary Examiner.*